(12) United States Patent
Outwater

(10) Patent No.: US 7,984,852 B2
(45) Date of Patent: Jul. 26, 2011

(54) RECHARGE ELECTRICAL APPARATUS AND METHOD FOR ELECTRIC VEHICLES

(75) Inventor: Chris Outwater, Santa Barbara, CA (US)

(73) Assignee: Liberty Plugins, Inc., Santa Barbara, CA (US)

( * ) Notice: Subject to any disclaimer, the term of this patent is extended or adjusted under 35 U.S.C. 154(b) by 513 days.

(21) Appl. No.: 12/284,167

(22) Filed: Sep. 18, 2008

(65) Prior Publication Data

US 2010/0065627 A1    Mar. 18, 2010

(51) Int. Cl.
*G06K 5/00*    (2006.01)
(52) U.S. Cl. ........................ 235/381; 235/380
(58) Field of Classification Search .................. 235/381, 235/492, 486, 487, 375, 380
See application file for complete search history.

(56) References Cited

U.S. PATENT DOCUMENTS

| | | | | |
|---|---|---|---|---|
| 3,524,029 | A | 8/1970 | Laff | 200/44 |
| 4,052,655 | A | 10/1977 | Vizza | 320/2 |
| 4,167,658 | A | 9/1979 | Sherman | 200/44 |
| 4,184,580 | A | 1/1980 | Ellis, Jr. | 194/1 R |
| 4,479,688 | A | 10/1984 | Jennings | 339/37 |
| 4,532,418 | A * | 7/1985 | Meese et al. | 235/381 |
| 5,214,587 | A | 5/1993 | Green | 364/464.04 |
| 5,263,565 | A | 11/1993 | Wilkinson | 194/216 |
| 5,434,368 | A | 7/1995 | Hoffmann | 200/43.22 |
| 5,486,725 | A | 1/1996 | Keizer et al. | 306/116 |
| 5,507,656 | A | 4/1996 | Ales | 439/133 |
| 5,812,643 | A | 9/1998 | Schelberg, Jr. et al. | 379/93.12 |
| 5,910,722 | A * | 6/1999 | Lyons et al. | 320/104 |
| 6,081,205 | A * | 6/2000 | Williams | 340/932.2 |
| 6,202,161 | B1 | 3/2001 | Wang | 713/310 |
| 6,417,647 | B2 | 7/2002 | Kaji et al. | 320/132 |
| 6,454,368 | B1 | 9/2002 | Bedau et al. | 312/223.1 |
| 7,004,385 | B1 * | 2/2006 | Douglass | 235/379 |
| 7,023,341 | B2 | 4/2006 | Stilp | 340/572.1 |
| 2003/0034757 | A1 | 2/2003 | Woodnorth | 320/132 |
| 2005/0081071 | A1 | 4/2005 | Huang et al. | 713/300 |
| 2006/0206735 | A1 | 9/2006 | Nagafusa | 713/300 |
| 2008/0072336 | A1 | 3/2008 | Tung et al. | 726/34 |

* cited by examiner

*Primary Examiner* — Thien M Le
(74) *Attorney, Agent, or Firm* — Clifford Kraft

(57) ABSTRACT

A public or private electric charging station or device for an electric vehicle. A user can approach an outlet station in an electric car, plug the car into the station similar to using a gasoline pump, present a credit card to the system, and be provided with either standard line voltage of sufficient wattage to charge the battery of an electric or hybrid vehicle. After the vehicle is charged, the credit card debited for the correct amount for the power dispensed, or other arrangements to pay can be accommodated such as debiting a prepaid account. Optionally, the user can also inject (100) reverse-flow power back into the grid for credit and receive credit for the power injected. Several users can share the same station, and can identify themselves by key access, card swipe, biometrically, or by a card containing an RFID chip that contains their identity.

18 Claims, 4 Drawing Sheets

RECHARGE ELECTRICAL APPARATUS AND METHOD FOR ELECTRIC VEHICLES

BACKGROUND

1. Field of the Invention

The present invention relates generally to the field of electrical distribution and dispensing and more particularly to an apparatus and method for dispensing electrical power to recharge electric and hybrid vehicles having rechargeable batteries.

2. Description of the Problem and the Prior Art

As electric and hybrid vehicles become more and more common, methods of dispensing electricity to recharge onboard batteries is also becoming very important. In the near future, many vehicles will be able to simply "plug in" to the electric power grid to recharge their batteries. It will be necessary to have ways of controlling access to, and accounting for as well as charging fees for the dispensing of electric power. While it is certainly possible to charge a vehicle at an owner's residence, this in many cases will be inconvenient. For example, if an owner wishes to take a road trip in an electric vehicle, along the way, he or she may need to recharge batteries. In an apartment complex, different residents may want to charge their vehicles. Some cars are hybrid having both an electric motor and an internal combustion engine. Recharging can take place from the internal combustion engine and from waste energy recovered from braking; however, this may be more expensive than simply buying electricity at a public or private "service station". It would be advantageous to have an apparatus and method for distributing electricity, keeping track of who is buying it, charging them for the service by perhaps billing a credit card, or identifying particular users of a group charging station such as an apartment complex by some method of identification, so that users can be individually billed.

Numerous devices exist in the prior art for preventing physical access to a source of electricity. Laff in U.S. Pat. No. 3,524,029 teaches an electrical outlet with a lock and key. Sherman in U.S. Pat. No. 4,167,658 teaches a security outlet having a lock. Ellis, Jr. in U.S. Pat. No. 4,184,580 teaches a coin operated battery charge that operates similar to a parking meter. Wilkinson in U.S. Pat. No. 5,263,565 teaches a combination parking meter and electric energy dispensing device containing a microprocessor. Keizer et al. Teach a security power interrupt device with a microcontroller and keypad, while Schelberg Jr. et al. teach a power telecommunications access vending machine that provides both telecommunications access for a computer and power for it. Kaji et al. teach a charging server with account management, while Woodnorth in US application 2003/0034757 teaches providing a battery device to a user such as a cellular telephone and then automatically charging for the service. Numerous other references teach the use of keypads, biometrics and/or RFID chips for identification.

It would be advantageous to have an apparatus and method for recharging batteries for electric cars using 110V, 220V or any standard voltage that could operate in the fashion of a public or private service station or as a small private dispensing system.

SUMMARY OF THE INVENTION

The present invention relates to an apparatus and method for providing a public or private electric charging station or device. In the case of a public station, a user can approach an outlet platform in an electric car, plug the car into the platform similar to using a gasoline pump, present a credit card to the system or otherwise arrange for payment, and be provided with either standard line voltage of sufficient wattage to charge the battery, or be provided with a particular voltage power source necessary for the job. After the vehicle is charged, the amount of power provided can be totaled, and either the credit card debited for the correct amount, or other arrangements to pay for the service can be accommodated such as debiting a prepaid account. In the case of a private or semi-private dispensing station, several users can share the same station as subscribers, and can identify themselves to the station by key access with password, by card swipe, or by presenting a card containing an RFID chip that contains their identity. Service provided could then be billed to a prepaid or subscriber account. In the case of a small plug-in device, the device can identify a user using a card with a built-in RFID tag or keypad. A central computer can manage several remote power dispensing stations over a network like the internet or any other type of network. In some embodiments of the present invention, the user can optionally inject reverse flow power back into the electric grid and receive credit for this. Also, in some embodiments, dynamic electrical rates can be taken advantage of. In this case, a dispensing device communicates with a rate advisory service to provide a current rate for electricity. The user in some embodiments of the present invention can cause the beginning of charging to be delayed until a certain rate is reached with optional override at a certain time if the chosen rate is not reached. This is especially attractive for charging at night where rates may drop later in the night due to less demand for electricity.

DESCRIPTION OF THE FIGURES

Attention is now directed to certain illustrations that aid in understanding the present invention.

Several illustrations and drawings have been provided to help understand the present invention. The scope of the present invention is not limited by what is shown in the figures.

DESCRIPTION OF THE INVENTION

The present invention relates to a public or private recharging station or service station for recharging the batteries of electric or hybrid electric vehicles. While hybrid vehicles can recharge batteries from an internal combustion engine, and many electric and hybrid vehicles perform partial recharging using energy from braking and the like, still with the wide spread use of electric vehicles, there will be a need and desire to recharge them from the power grid.

Figure 1:
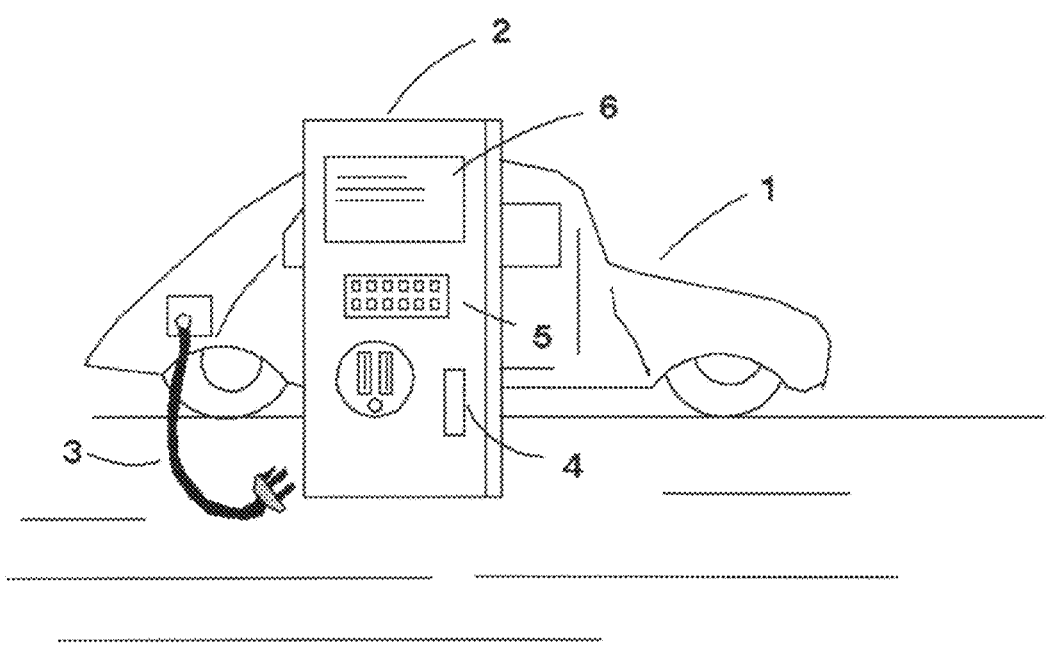
FIG. 1 shows a view of a public or private service outlet that can provide electric power to charge and electric vehicle.

FIG. 1 shows an electric service station arrangement. Vehicles 1 enter the station and stop at an electric dispensing outlet or kiosk 2. This can be a public station or a private station that is only used by particular members or subscribers such as residents of an apartment complex. After stopping, the vehicle's recharge cable 3 can be plugged into a power outlet in the kiosk. This cable 3 can contain a plug and separate electrical safety ground, or an optional safety ground strap can be connected to the vehicle. The user then normally enters either a credit card into a card swipe 4, or member identification into a keypad 5 or other personal identification device. An optional card with an RFID chip installed containing the user's identification information may be used in either situation. This latter method is particularly useful for identifying a member of a private group of users or a subscriber to a subscriber service. An optional identification device can also be biometric such as a fingerprint reader or other biometric identification device known in the art.

The dispenser, kiosk or device 2 then applies electric power in a controlled way to the vehicle's charge cable 3 at the correct voltage (which may be selected by the user). Power is typically monitored in the dispenser 2 in terms of maximum current flow and total power supplied. The dispenser 2 can have an optional monitor screen 6 that can be used to communicate with the user. Any problems associated with the recharge can be placed on this monitor 6 so the user can correct them. These can include a loose or unconnected cable, a short circuit or too low an impedance into the cable (which would attempt to draw too much current), bad credit card, bad identification and the like. It is also within the scope of the present invention to have a separate digital or analog data communications circuit between the dispenser or kiosk 2 and the vehicle 1. This optional communications path would be useful for automatic identification and billing, control of the charging rate and charging voltage for DC chargers, and identification of problems with the charging process from the vehicle including a charging stop command from the vehicle. Even with the more common AC charging, a separate data communications path can be useful for a "plug and charge" operation where identification and billing are handled automatically, and the vehicle electronically identifies itself to the system.

Figure 2:
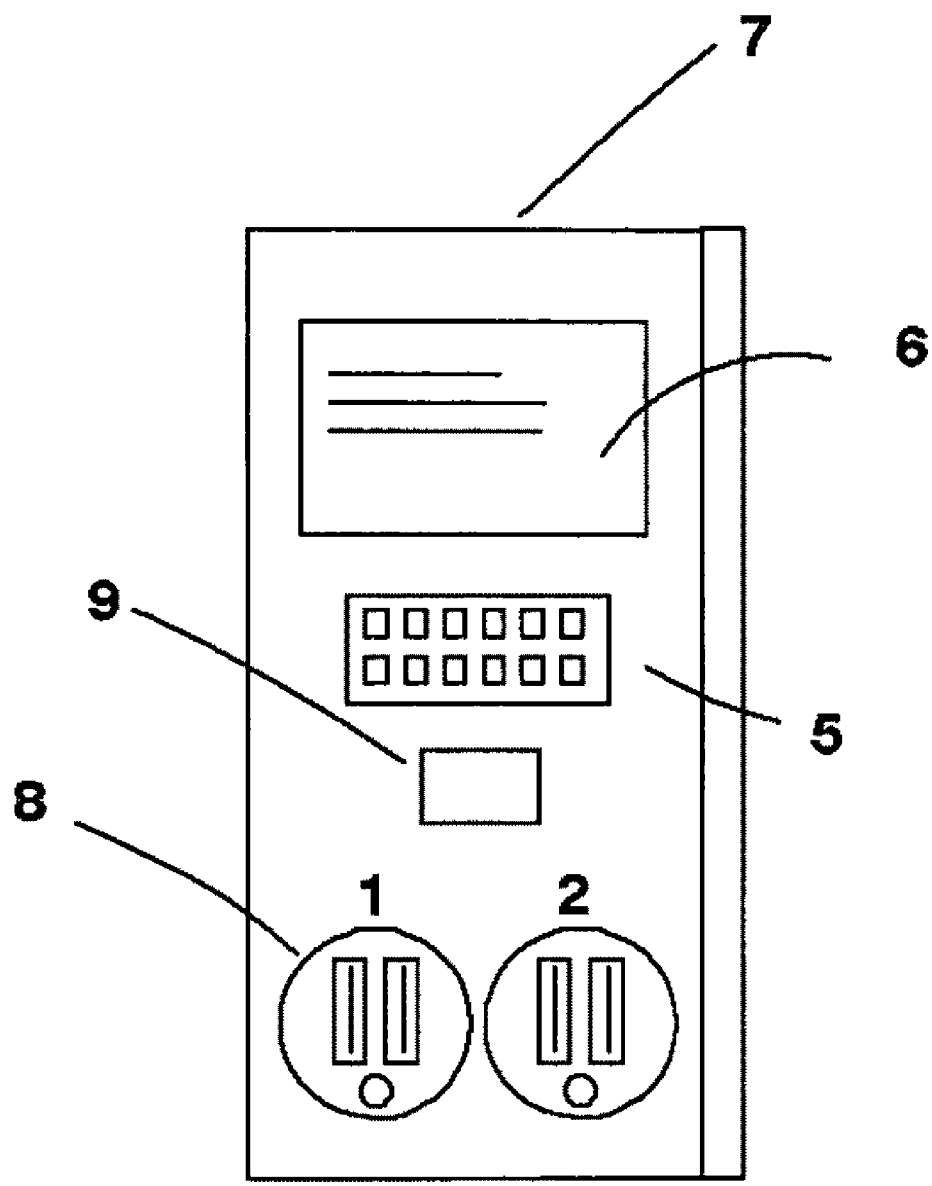
FIG. 2 shows a small private charging device that could be used in a smaller, more private environment such as an apartment complex.

FIG. 2 shows a smaller power dispensing device that could be used in a smaller environment than a public service station. A housing 7 contains a power circuit that provides either 110V or 220V or some other standard line value of electric power. Electrical outlets 8 allow plugging in a charging cable from an electric vehicle. A keypad 5 and/or RFID reader 9 allows identification of the particular user. A screen, monitor or LED 6 can display status, billing, power dispensed or any other quantity. This screen or monitor 6 can be as large or small as desired. A metering circuit inside the device monitors the amount of power dispensed and either directly handles billing or communicates with a remote computer that handles billing. A particular remote computer could handle several of the small charging stations shown in FIG. 2.

Figure 3:
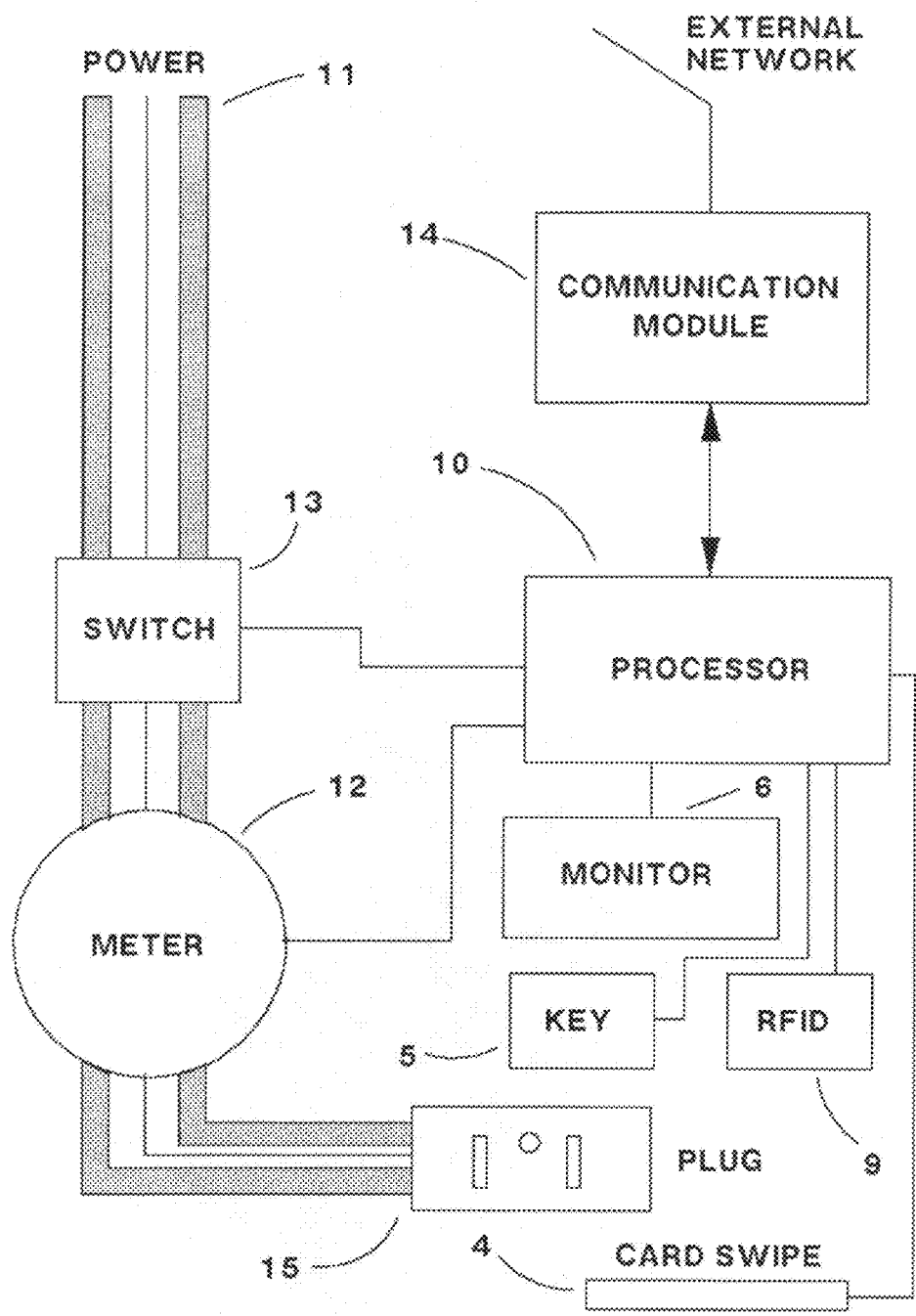
FIG. 3 shows a block diagram of an embodiment of the present invention that can provide electric charging service.

FIG. 3 shows a block diagram of a power dispensing unit designed for a public or private electric service station. A processor 10 controls the device. This processor 10 can be any commercial microprocessor, microcontroller or other processor device. A power supply 11 enters the device. This can be a conventional 110 V. or 220 V. source or a special voltage source. A metering circuit 12 typically measures the amount of supplied power in kilowatt hours (kWH) or other unit. An electronic power switch 13 allows access to the power and is normally under the control of the processor 10. A keypad 5 and optional RFID reader 9, optional monitor screen 6 and credit card swipe 4 can also be individually supplied and connected to the processor 10. An optional communications module 14 can communicate with an external computer or server to okay and transact credit card sales, debit a user's account in a subscriber service and perform overall management services.

The power metering or monitoring device 12 can be similar to a standard electronic power meter known in the art. This device typically reports a continuously increasing digital number to the processor 10. The processor can note the number contained in the meter 12 when dispensing starts and again when dispensing is complete. The processor 10 subtracts the two numbers to determine the number of kilowatt hours of electricity that was dispensed. Alternatively, the meter 12 could be reset between each dispense by the processor 10 starting at zero each time. After power is switched and metered, it can be applied to an outlet 15 for dispensing to an electric vehicle or any other device needing electric power.

The amount charged the user or debited from his or her account can be based on a fixed rate for electricity plus a surcharge in the case of a public station, or can be based on a variable rate for electricity where the exact charge may depend on the time of year, time of day and other factors. In the case of variable rate electricity, the communication module 14 determines the rate via a computer network which may be the Internet, or directly from a power company computer. This rate can be supplied dynamically to the processor 10 and can be supplied continuously without asking.

The optional communication module 14 can be any circuitry capable of communicating with other computers. The preferred case is an interface into the Internet. Communications module 14 can be a telephone modem, DSL modem, cable modem, WiFi device, cellular telephone or any other communication device capable of communicating with another computer or server anywhere on one or more networks.

Figure 4:
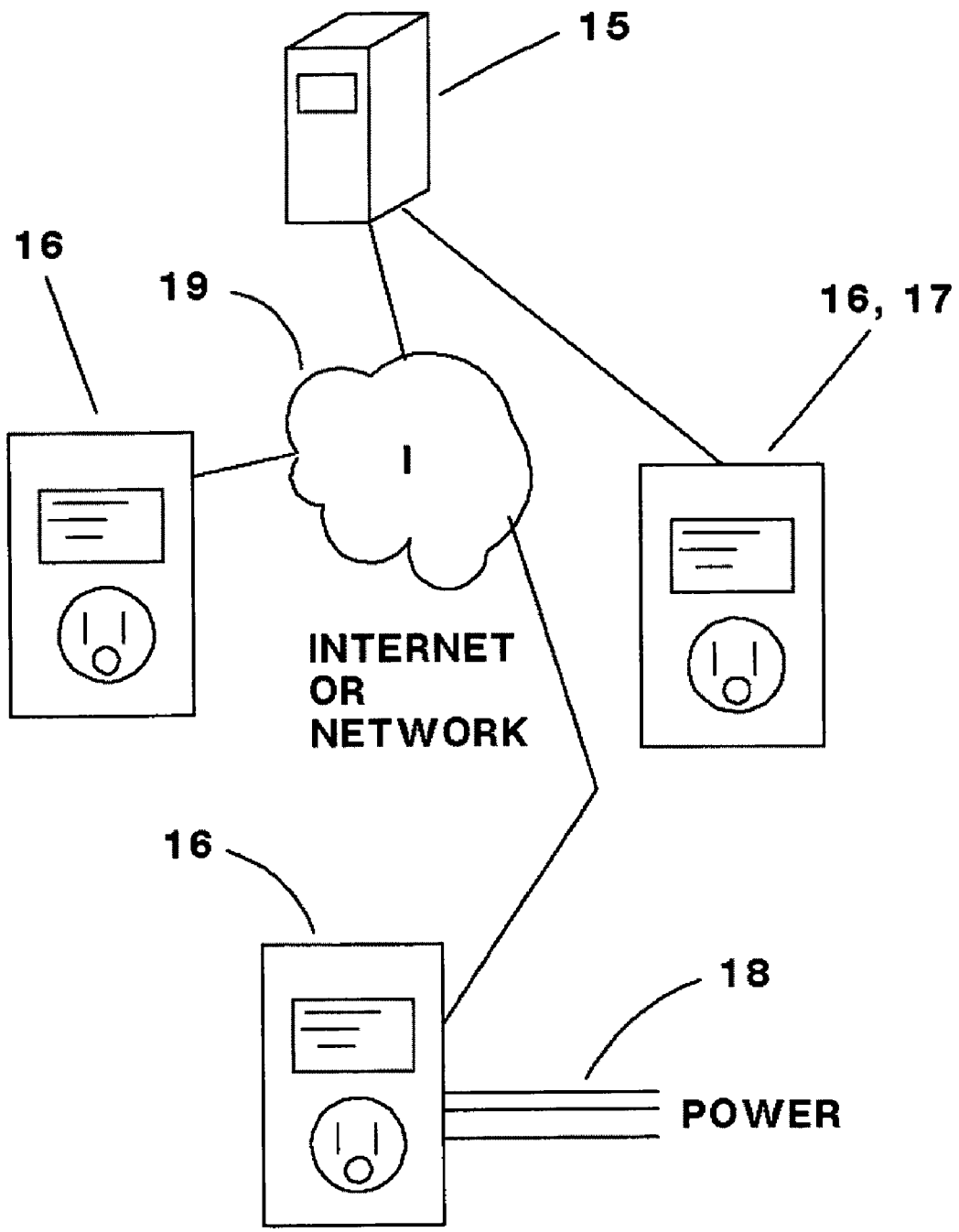
FIG. 4 shows a central station controlling several remote power dispensing stations.

FIG. 4 shows a system with a central control computer 15 with communication over a network (such as the Internet) 19 with several electric power dispensing stations 16. Each independent station 16 can have its own source of power 18 and can be of the type shown in FIGS. 1-3. The central computer 15 can maintain user or subscriber accounts. As each station 16 dispenses power, the central computer controls billing, credit card verification (if necessary), identification acknowledgement of the user and overall accounting for the system.

It is known in the art to have dynamic electric power rates where electricity may be purchased at different times according to instantaneous or short-term billing rates. The present invention can make use of this by staying in contact via a communication module with a rate advisory service and advising the user of the current rate, or by delaying a vehicle charge-up until a time when rates are favorable. For example, a user could plug a rechargeable electric vehicle into the present invention in the evening with instructions to hold off the beginning of charging until the rate drops under nighttime loading conditions to a particular rate with further instructions to begin charging regardless of rate by a particular time (like 3 AM for example) to make sure that the car indeed does get charged in time for use.

The present invention in one particular mode operates by billing a credit card for power dispensed in a manner similar to a present day gas station. However, it is also possible in some situations for a user to put power back into the grid. The present invention allows reverse flow electric power where an electric vehicle or other device or part of a house or structure can put electricity back into the grid, and where the user can receive credit for this electricity. In this mode, the user's credit card or account can be credited for the amount of power that he or she dispenses back to the grid.

Embodiments of the present invention can range from small devices in housings that either insert into an electric outlet and control dispensing of power, to networked systems of private or public electric dispensing stations.

Several descriptions and illustrations have been provided to aid in understanding the present invention. One skilled in the art will realize that numerous changes and variations are possible without departing from the spirit of the invention. Each of these changes and variations is within the scope of the present invention.

I claim:

1. An electric vehicle charging device comprising:
   a power source
   a power metering device in electrical communication with said power source;
   a power switch in series with said power source;
   a processor in communication with said power metering device and said power switch;
   a credit card swipe device;
   wherein said power switch allows power dispensing to a user from said power source in order to charge an electric vehicle when said user has swiped a valid credit card, and wherein said processor charges said credit card for electric power dispensed;
   and wherein said user can inject reverse flow electrical energy into said charging device and receive credit for said reverse flow electricity.

2. The electric vehicle charging device of claim 1 further comprising a communication module connected to said processor wherein said communication module communicates over a network with a remote computer.

3. The electric vehicle charging device of claim 1 further comprising a user identification device.

4. The electric vehicle charging device of claim 3 wherein said user identification device contains an RFID reader.

5. The electric vehicle charging device of claim 3 wherein said user identification device is biometric.

6. The electric vehicle charging device of claim 1 further comprising a keypad.

7. The electric vehicle charging device of claim 1 further comprising a monitor connected to said processor.

8. The electric vehicle charging device of claim 1 wherein said user is charged according to dynamic electric power rates.

9. An electric vehicle charging device comprising:
   a power source
   a power metering device in electrical communication with said power source;
   a power switch in series with said power source;
   a processor in communication with said power metering device and said power switch;
   a user identification device connected to said processor;
   a communication module connected to said processor wherein said communication module allows said processor to communicate with a remote computer;
   wherein upon command from said processor, said power switch allows power dispensing to a user from said power source in order to charge an electric vehicle when said user has presented proper identification to said user identification device, wherein said processor charges said user for electric power dispensed and wherein said processor can delay charging for either a fixed period of time or until a particular dynamic electrical rate is reached;
   and wherein said user can inject reverse flow power back into said charging device and receive credit for this reverse flow power.

10. The electric vehicle charging device of claim 9 further comprising a credit card swipe connected to said processor.

11. The electric vehicle charging device of claim 9 further comprising a keypad.

12. The electric vehicle charging device of claim 9 wherein said user identification device contains an RFID reader.

13. The electric vehicle charging device of claim 9 wherein said user identification device is biometric.

14. The electric vehicle charging device of claim 9 further comprising a monitor connected to said processor.

15. The electric vehicle charging device of claim 9 wherein said remote computer communicates over a network with other electric vehicle charging devices.

16. An electric vehicle charging device comprising:
   a power source
   a power metering device in electrical communication with said power source;
   a power switch in series with said power source;
   a processor in communication with said power metering device and said power switch;
   a credit card swipe connected to said processor;
   a communication module connected to said processor wherein said communication module allows said processor to communicate with a remote computer; and
   wherein upon command from said processor, said power switch allows power dispensing to a user from said power source in order to charge an electric vehicle when said user has presented a valid credit card, and wherein said processor charges said credit card for electric power dispensed; and
   wherein said remote computer communicates over a network with other electric vehicle charging devices;
   and wherein said user can inject reverse flow power back into said charging device and receive credit for this reverse flow power.

17. The electric vehicle charging device of claim 16 wherein said user identification device contains an RFID reader.

18. The electric vehicle charging device of claim 16 further comprising a monitor connected to said processor.

* * * * *